United States Patent [19]
Yorozu et al.

[11] Patent Number: 4,722,054
[45] Date of Patent: Jan. 26, 1988

[54] INPUT SYSTEM FOR POS TERMINAL

[75] Inventors: Shin-ichi Yorozu, Chofu; Masahiko Fukushima, Urayasu, both of Japan

[73] Assignee: NCR Corporation, Dayton, Ohio

[21] Appl. No.: 753,488

[22] Filed: Jul. 10, 1985

[30] Foreign Application Priority Data

Oct. 31, 1984 [JP] Japan .................. 59-228040

[51] Int. Cl.[4] .............................................. G06K 5/00
[52] U.S. Cl. .................................. 364/401; 364/405; 235/379; 235/380
[58] Field of Search ............... 364/401, 200, 900, 405; 235/379, 380, 381

[56] References Cited

U.S. PATENT DOCUMENTS

| | | | |
|---|---|---|---|
| 3,571,957 | 3/1971 | Cumming et al. | 40/2.2 |
| 3,728,522 | 4/1973 | Norwich | 235/61.7 B |
| 3,786,420 | 1/1984 | Stambler | 340/149 A |
| 4,123,747 | 10/1978 | Lancto et al. | 340/149 A |
| 4,295,039 | 10/1981 | Stuckert | 235/380 |
| 4,341,951 | 7/1982 | Benton | 235/379 |
| 4,418,277 | 11/1983 | Tremmel et al. | 235/472 |
| 4,575,621 | 3/1986 | Dreifus | 235/380 |
| 4,634,845 | 1/1987 | Hale et al. | 235/379 |
| 4,689,478 | 8/1987 | Hale et al. | 235/380 |

Primary Examiner—Jerry Smith
Assistant Examiner—Charles B. Meyer
Attorney, Agent, or Firm—Wilbert Hawk, Jr.; Albert L. Sessler, Jr.; George J. Muckenthaler

[57] ABSTRACT

A customer information input system for a P.O.S. terminal includes a portable type wireless input device that has a magnetic card reader section a key entry section for inputting customer data, for reading information from the card, a memory section for storing the information and the data, a transmitting section for sending the information and the data in response to a request signal, and a repeater connected to the P.O.S. terminal for transferring the information and the data to the P.O.S. terminal. A plurality of such input devices are placed at various sales counters and customers can simultaneously input the information and the data for transmission to the terminal which receives and processes the transaction.

12 Claims, 12 Drawing Figures

INPUT SYSTEM FOR POS TERMINAL

BACKGROUND OF THE INVENTION

In the area of merchandising, the use of point-of-sale (POS) terminals has greatly increased to provide fast and efficient service to the customers. Such POS terminals are found in various industries such as gasoline service stations, department stores, supermarkets, restaurants, motels, and like businesses wherein credit cards are commonly utilized for customer and product information. More recently, the POS systems have been connected in on-line manner between individual shops or remote areas of a department store and an associated computer center. Further, a system may be directly connected in such on-line manner between the shops or areas and a computer center of a credit service agency to check the good faith of the credit card holder. Still further, such system may be connected between the shops and a bank computer center over telephone lines for the purpose of paying the product price directly from the customer's account.

In paying for products by such methods with the credit (or debit) cards, some systems require that the customer input certain personal information, for example, a personal identification number (PI number or PIN), for the purpose of verifying whether or not the holder of the card is in fact the owner thereof. In order to maintain secrecy of the PIN and like customer data or information, it is also desirable that the card holder or card owner input such information rather than a store clerk or bank teller or like employee.

It is known in the prior art that a PIN input device has been connected to a POS terminal over a cable to permit entry of the input information by the customer. Further it is known that a PIN input device can be physically separated from the terminal or register and the data is transmitted by means of light emitting signals. The PIN input device thus converts successively input figures or characters (the PIN) into light emitting signals for sending to a light receiving section provided on the terminal or register. The light emitting signals are received by the terminal or register and are converted again into electrical signals so that it is not necessary to use a cable for connecting between the PIN input device and the register.

It is seen that in the conventional devices noted above, a disadvantage occurs when a customer is not familiar with or accustomed to the input operation of the PIN data or information and much time is taken or wasted for inputting such data or information with the result that a sales counter becomes crowded or jammed because it is necessary to mate or match the operation of the POS terminal or register with the time of input of the data or information by the customer. While a customer may purchase an item and pay cash at a sales counter remote from a POS terminal, it is necessary for the customer to go to the sales counter having a card handling function in order to input the customer information for a charge purchase. Accordingly, the conventional systems have the disadvantage in that customer service is less convenient in department stores or large supermarkets having remote sales areas.

Representative prior art in the field of credit transaction systems includes U.S. Pat. No. 3,571,957, issued to P. N. Cumming et al. on Mar. 23, 1971, which discloses a credit card insertable into a viewer for enlarging card indicia and projecting same on a display, and including keyboard means permitting entry of additional indicia for calling upon the central computer to condition the operation for transactions against a specified account.

U.S. Pat. No. 3,728,522, issued to D. Norwich on Apr. 17, 1973, discloses a credit transaction system for use with cards and sales records wherein recorded information may include identification of the card holder, the transaction, the location, and the value transacted for processing by a computing facility.

U.S. Pat. No. 4,123,747, issued to D. C. Lancto on Oct. 31, 1978, discloses a system having an administrative terminal and one or more inquiry terminals connected to a computer with personal identification key pads connected to the terminals.

U.S. Pat. No. 4,295,039, issued to P. E. Stuckert on Oct. 31, 1981, discloses a system including use of a credit card operable with a utilization (U/I) terminal wherein the card is inserted into a personal portable transaction (XATR) terminal and such portable terminal is then inserted into the U/I terminal. The XATR terminal contains a keyboard for entering the card holder's data.

U.S. Pat. No. 4,418,277, issued to H. Tremmel et al. on Nov. 29, 1983, discloses apparatus including a number of physically separated receiving/transmitting units coupled to a data processor to permit use within a large region or to permit use simultaneously. A keyboard may be coupled to the apparatus.

U.S. application Ser. No. 685,622, now U.S. Pat. No. 4,689,478, issued to Hale et al and assigned to the same assignee as this application.

U.S. Pat. No. 4,634,845, issued to Hale et al, and assigned to the same assignee as this application.

SUMMARY OF THE INVENTION

The present invention relates to input systems for POS terminals. More particularly, the invention relates to customer information input systems which utilize credit cards, bank cards, debit cards and the like for inputting card data (magnetic form information) and customer data such as a personal identification number (PI number or PIN) and the like into the POS terminal.

In accordance with the present invention, there is provided a customer information input system for POS terminals of the kind specified, characterized by a portable type of wireless customer information input device including a magnetic card reader section for reading magnetic information recorded on a card, a key entry section for inputting customer data, a memory section for storing the magnetic information thus read and the customer data thus inputted, a transmitting section for sending the stored magnetic information and customer data in response to a request-to-send signal, and a repeater connected to a POS terminal and connected to said input device. Dependent on demand, and when connected to said input device, magnetic information and customer data are transferred from the input device to the POS terminal in response to a request-to-send signal, whereby the customer data and the magnetic information may be inputted to the customer information input system as payment tendered for purchase of goods at a sales floor without going to a sales counter.

The present invention makes it possible for a plurality of customers to input their customer information such as the magnetic information and PIN data at the same time in parallel with each other, by utilizing a respective wireless and portable input device in such manner that after each customer inputs his customer information to an input device for storage independently of that of another customer, the sales-clerks receive the input devices from the customers and respectively connect the input devices one-by-one in sequence as received with a repeater which is provided on the sales-counter to transfer the stored information in the input device to a POS terminal.

In view of the above discussion, it is the principal object of the present invention to provide a customer information input system for a POS terminal.

Another object of the present invention is to provide a customer information input system for the POS terminals which is capable of performing the card reading operation and the personal data inputting operation independently of the operation of the POS terminals.

An additional object of the present invention is to provide a customer information input device operably associated with a POS terminal wherein information is transmitted from the input device to the POS Terminal in response to demand thereon and request signals.

A further object of the present invention is to provide a customer information input system for the POS terminals which permits a plurality of customers to input their customer data and magnetic information at the same time for one POS terminal by means of using the respective customer information input system.

Additional objects and advantages of the present invention will become apparent and fully understood from a reading of the following specification taken together with the annexed drawing.

DESCRIPTION OF THE PREFERRED EMBODIMENT

Figure 1:
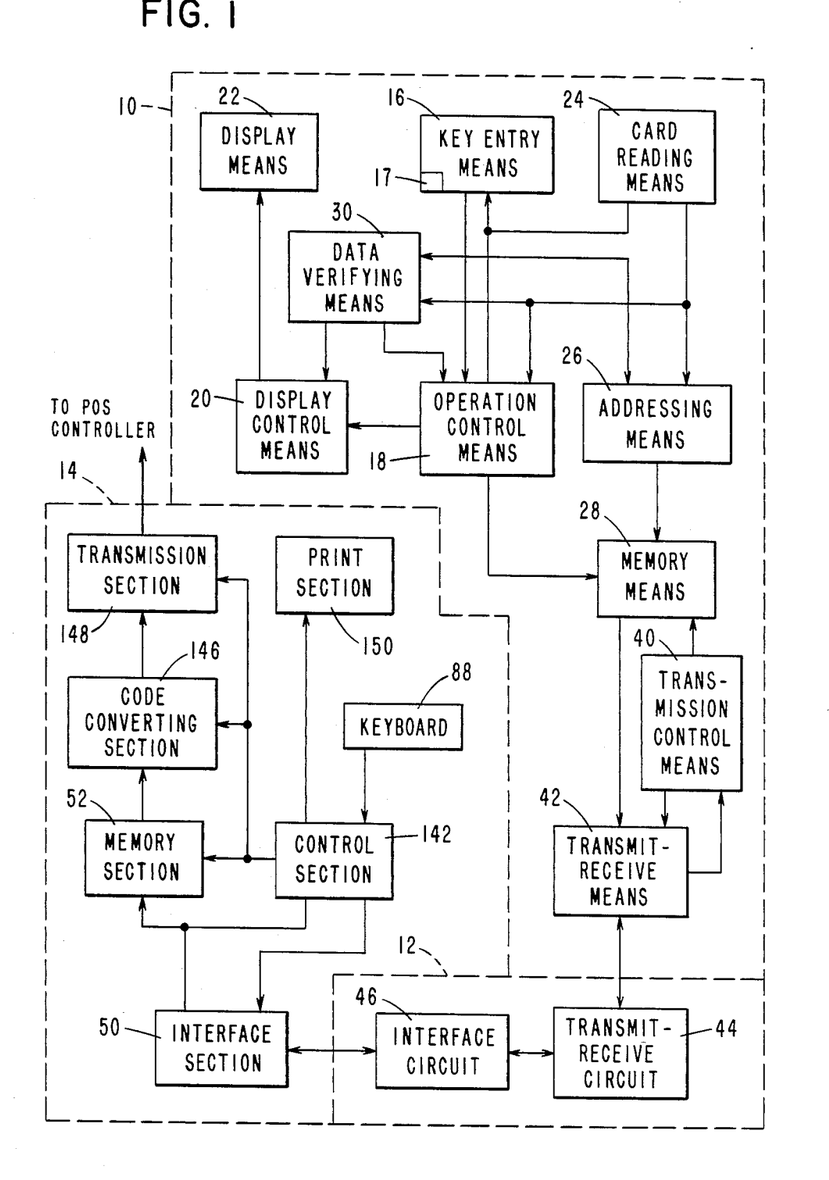
FIG. 1 is a block diagram illustrating the general structure of one embodiment of the present invention.

Referring now to FIG. 1, there is shown a block diagram illustrating the general structure of one embodiment of the present invention, and including an input device 10 associated with a repeater device 12 and a POS terminal 14.

Figure 7:
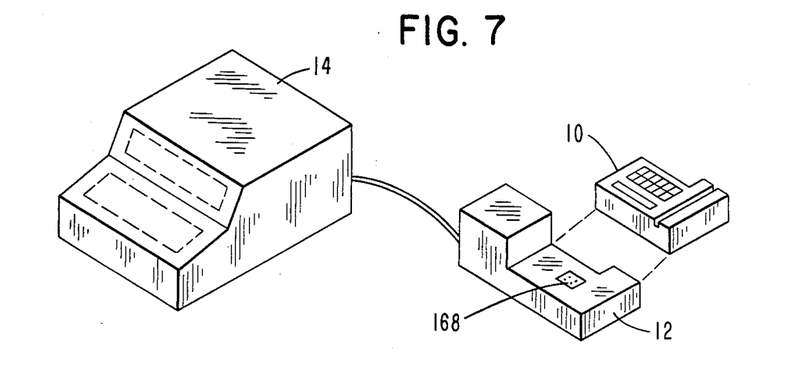
FIG. 7 is a perspective view of preferred components of the present invention.

FIG. 7 is a perspective view showing the outline of the embodiment of the present invention. In the operation of the invention, a salesclerk passes the input device 10 to a customer and after the card reading and PIN inputting operations by the customer, the clerk receives the input device from the customer and goes to the sales counter with the purchases and the input device in hand. The salesclerk sets the input device 10 on the repeater 12 provided on the sales counter and then passes the purchases to a cashier and informs same that the purchases are to be paid by card, after which the cashier presses the request-to-send key. The input device 10 receives the request-to-send signal and starts to transfer the stored data to the POS terminal 14. The POS terminal 14 inquires of the computer center of a bank or a company which issued the card concerning certain information about the customer holding the card and concerning information transferred from the input device 10 on-line via the computer center connected to the POS terminal 14 in the store, or by public telephone lines. As a result of such inquiry, the transaction is permitted to proceed after performing a normal registering operation by using the POS terminal 14, and the amount for the purchases is settled by the customer file in the computer center of the company or the bank. The card transaction is completed when the salesclerk hands over the purchases and a POS terminal 14 printed receipt to the customer.

An entry start key of a key entry means 16 is depressed and an entry start signal is sent to an operation control means 18. The operation control means 18 controls a display control means 20 to cause a display means 22 to make a display indicative of card input and enables a card reading means 24 to read a magnetic card. When the card is read, an addressing means 26 designates a memory address in which the read data is stored and the data thus read is stored in a memory means 28 at the predetermined address and checked for error by a data verifying means 30. When a read error is detected, an error signal is sent to the display control means 20 and the operation control means 18 for display of the error on the display means 22 to request a rereading of the card. At the completion of the card reading, the operation control means 18 controls the display control means 20 so as to make a display indicative of a request for inputting a PIN (PI Number or Personal Identification Number) and enables the key entry means 16. When the PIN is correctly inputted through the key entry means 16, the input data is addressed by the addressing means 26 and then stored in the memory means 28. The inputting operation is completed by pressing a completion key 17 after the PIN is inputted, and while waiting for a request-to-send signal which will be sent from the repeater 12.

The input device 10 may also be constructed so as to compare a PIN which is magnetically recorded in the card with an inputted PIN which is inputted through the key entry means 16 thereby demanding the re-input of the PIN if the numbers are not equal to each other.

Figure 2:
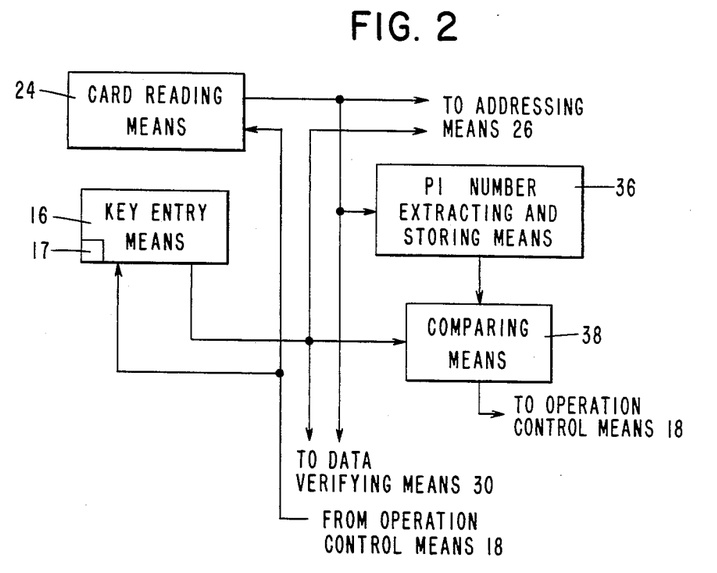
FIG. 2 is a block diagram illustrating a modified portion of the input device of FIG. 1.

FIG. 2 shows a modification of the structure mentioned above. All the parts which are not shown in FIG. 2 are the same as those of the input device 10 in FIG. 1. With reference to FIG. 2, the card read data (magnetic information) read from the magnetic card is sent to the addressing means 26 and to the data verifying means 30, as shown in FIG. 1, and also is sent to a PIN extracting and storing means 36 for extracting a PIN from the card read data and storing the extracted number in the storing means 36. When the PIN is inputted after the completion of card reading, a comparing means 38 compares the stored PIN extracted by means 36 with the PIN inputted through the key entry means 16. When these numbers coincide with each other, the inputting operation is completed by pressing the completion key 17 of the key entry means 16. On the other hand, when these numbers are different from each other, a request-to-reinput signal is sent from the comparing means 38 to the operation control means 18 and the indication of request-to-reinput is displayed on the display means 22 through the display control means 20. In this connection, instead of the PIN extracting and storing means 36, a PIN memory means (not shown) used for previously storing the PINs associated with available cards may be provided and the system may be arranged for comparing the PIN inputted through the key entry means 16 with the prestored PIN.

When the input device 10 is connected to the repeater 12 and according to the predetermined sequence of operation the request-to-send signal is sent from the repeater to the input device, a transmission control means 40 sequentially sends the card read data and the PIN stored in the memory means 18 to the repeater 12 via a transmit-receive means 42. The repeater 12 transfers the data received by a transmitreceive circuit 44 to the POS terminal 14 through an interface circuit 46.

The POS terminal 14 receives the data sent from the repeater 12 through an interface section 50 and stores it in a memory section 52. The stored data, after performing the code conversion according to the type of the card by any conventional technique, is sent to a computer center through a POS controller (FIG. 1) for the verification of the PIN, a credit balance check, and the like. When the verification and the credibility check are completed with no problems, the payment is performed in such a manner that the price for the purchased item is withdrawn from the customer's account stored in the computer center, or the transaction data, such as the price and the date, is registered into the customer file for settlement at the next due date.

Figure 3:
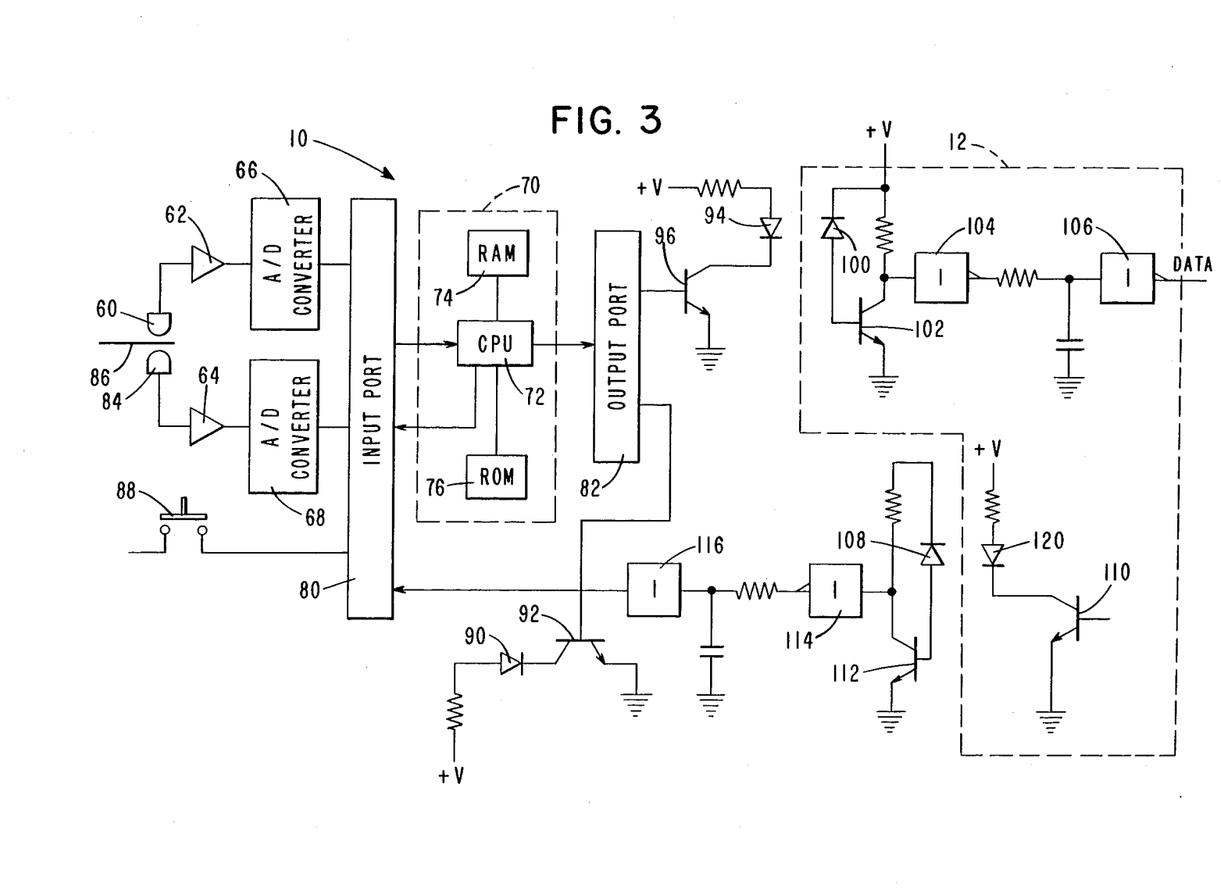
FIG. 3 is a combined block and schematic diagram of the input device and a portion of the repeater circuitry.

FIG. 3 is a schematic diagram showing a structural arrangement of the input device 10 and the partial arrangement of the repeater 12 according to an embodiment of the present invention, in which 60 is a magnetic reading head, 62 and 64 are amplifiers, 66 and 68 are A/D converter circuits, 70 is a well-known type microcomputer basically comprising a CPU 72, a RAM 74 and a ROM 76. A program for controlling the CPU 72 is written in the ROM 76 and the CPU, under the control of the program, operates to receive the required external data through an input port 80, exchanges data with the RAM 74 and outputs data thus processed to an output port 82 as required. The information magnetically recorded on the surface of the magnetic card is read by the magnetic reading head 60 and amplified by the amplifier 62, and after A/D conversion, it is sent to the CPU 72 through the input port 80, and then it is addressed to store in the RAM 74.

A magnetic reading head 84 is provided as required for reading the information magnetically recorded on an opposite surface to the reading head 60 of the card 86 and the information thus read is stored in the RAM 74 in similar manner to the case of the information read by the magnetic reading head 60. A keyboard 88 includes numeral (ten-key) and operation keys for inputting PIN's and operation instructions. The information inputted through the keyboard 88 is sent to the CPU 72 passing through the input port 80 and the PIN is stored in the RAM 74. A photo-diode 90 is provided for displaying operation procedure, error and the like and is controlled by the CPU 72 through a transistor 92 in response to the input from the magnetic reading heads 60 and 84 and the keyboard 88 in accordance with the instructions stored in the ROM 76. Liquid crystals may be utilized in the display of the operation procedure. A photo-diode 94 is provided for converting electric signals representing the read data and PIN received from the output port 82 through a transistor 96 into light signals for transmission to the repeater 12. The repeater 12 receives the optical signal data emitted from the photo-diode 94 and read by a photo-cell 100, and then converts it into an electric signal through a transistor 102, and inverters 104 and 106. A photocell 108 is provided which optically receives control signals such as the request-to-send signal and clock signals which are converted into optical signals by a transistor 110 and a photo-diode 120 of the repeater 12. The optical signals received by the photocell 108 are converted into electric signals through a transistor 112 and inverters 114 and 116 and sent to the CPU 72 through the input port 80 to be used as data transmission start and control signals. A plurality of photocouplers may be provided in the circuitry, the number of same depending on the number of the control signals. Although photo-couplers are used for reliability of transmission and reception of data signals and control signals between the input device 10 and the repeater 12 and for simplification in construction, conventional electric connections and acoustic couplers may be used. The input device 10 has the above mentioned functions and structure and is constructed compactly and light in weight so as to be easy to carry by a single hand.

Figure 4A:
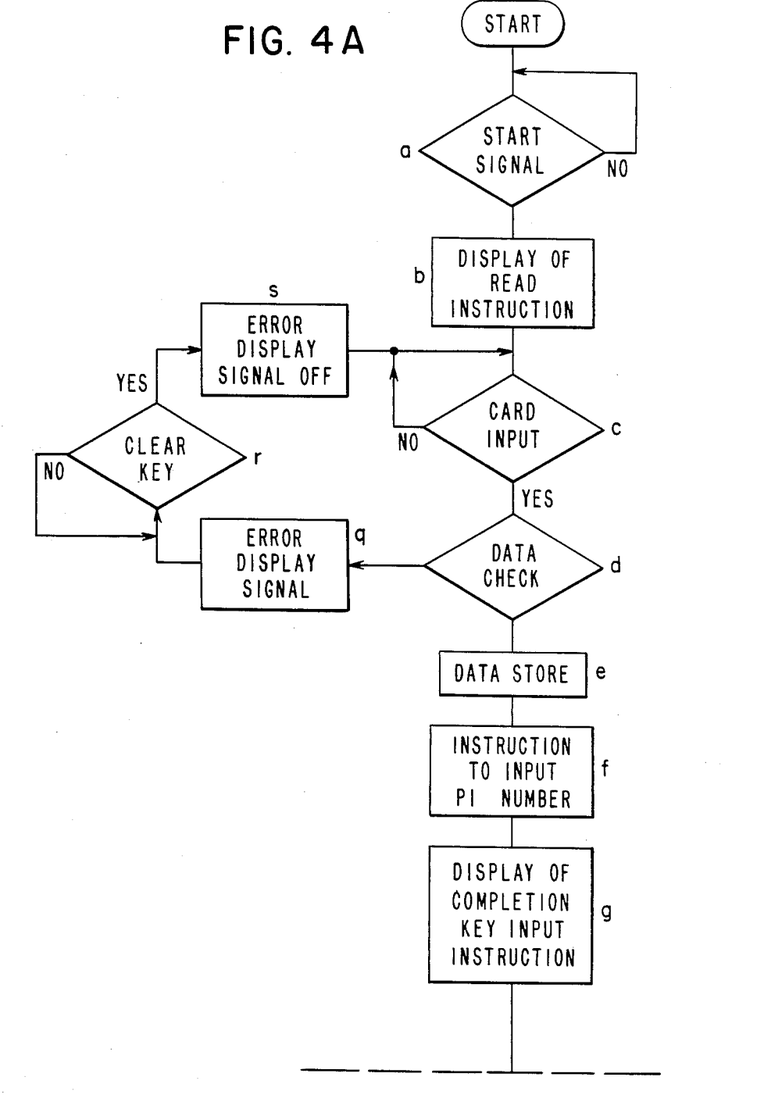
FIGS. 4A, 4B and 4C, taken together, constitute a flowchart of a program stored in one memory device of FIG. 3.
Figure 4B:
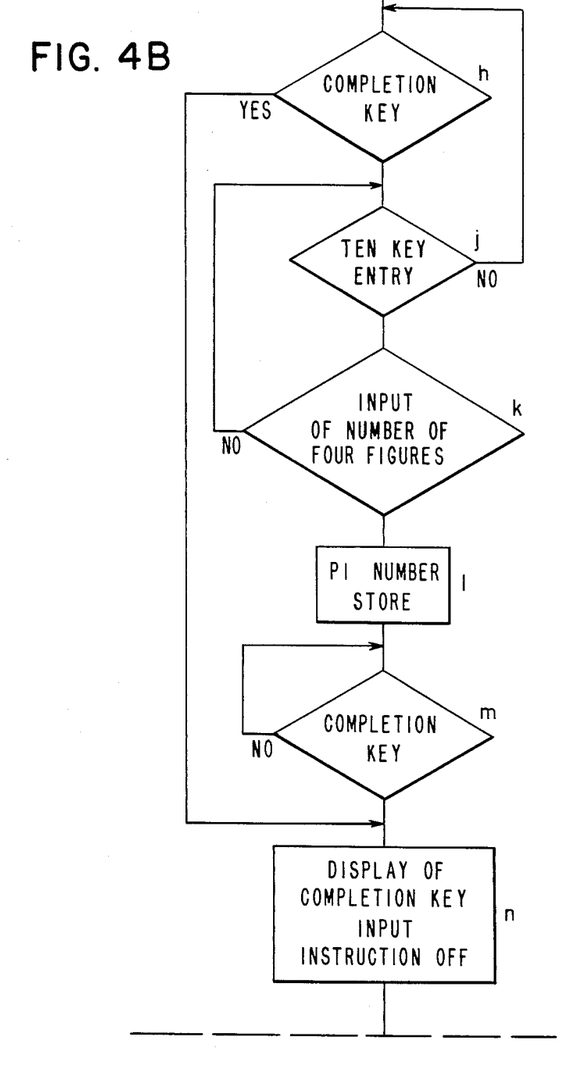
Figure 4C:
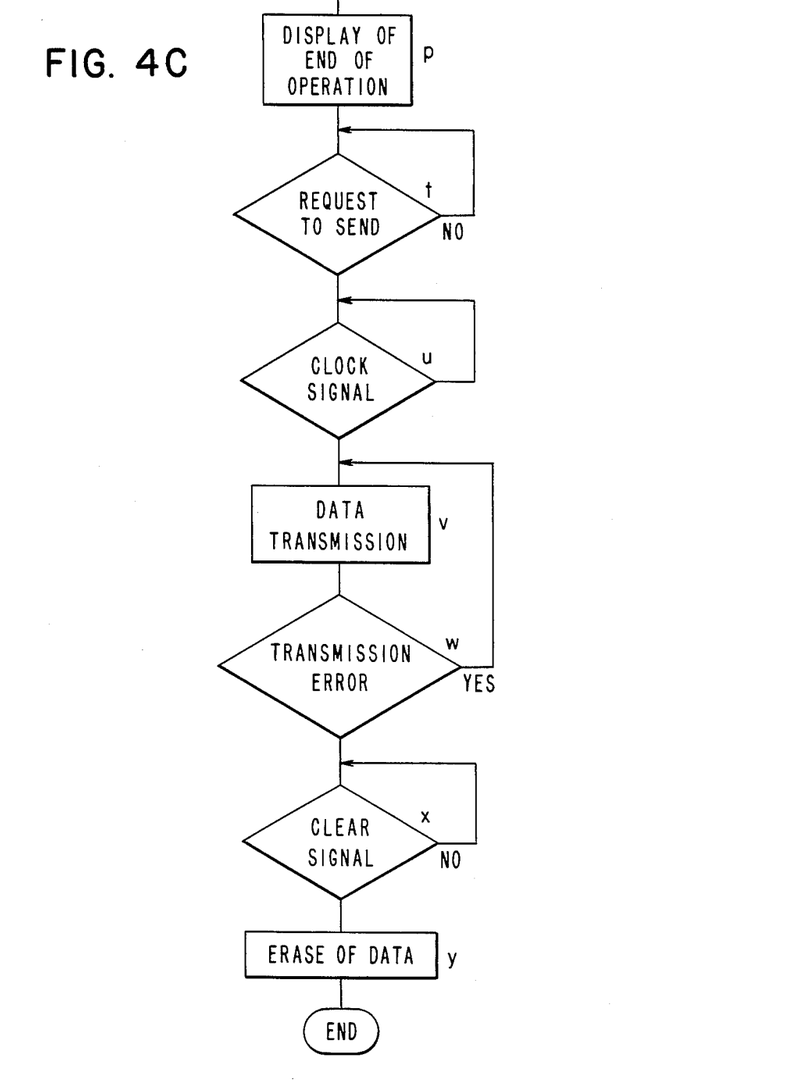

FIGS. 4A, 4B and 4C illustrate a flowchart of the operation of the system performed by the program instructions written in the ROM 76 of the processor 70 of input device 10 for transmitting data from the input device to the repeater 12. When the operation is started, the CPU 72 checks the presence of a start signal (Step a). When an input start key is depressed and the start signal is sent, the CPU 72 outputs the card reading instruction display signal to the output port 82 and waits for the card reading (Steps b, c). When the card reading data is sent upon performing a card reading operation, the CPU 72 checks the read data for correctness and stores it in the RAM 74 when it is correct (Steps d, e), or outputs an error display signal to the output port 82 when it is incorrect and waits for a clear signal generated by depressing a clear key (Steps q, r). When the clear key is depressed and the clear signal is sent to the CPU 72, the CPU turns the error display signal off and waits for the rereading of the card (Steps s, c). When the read data is correctly stored in the RAM 74 after rereading of the card, CPU 72 outputs the PIN input instruction display signal to the output port 82 (Step f).

In the case of the card which requires no PIN input through the keyboard 88, the CPU 72 also outputs a completion key input instruction display signal indicating that a completion key is to be depressed to the output port 82 simultaneously therewith (Step g). Then, the CPU 72 checks whether or not the completion signal generated by depressing the completion key is sent, and when received the completion signal turns the completion key input instruction display signal off and outputs an operation end display signal to terminate the input operation (Steps h, n, p). When no completion signal is present, the CPU 72 checks whether or not the keys of the ten-key keyboard (numeral keys), that is, means for inputting PIN, are depressed, and if they are not depressed, returns to the step h (Step j). When the ten-key entry is started, the CPU 72 checks whether or not the correct number of figures (normally four figures) are inputted. When the required number of figures are inputted, the inputted data is stored in the RAM 74 and turns the PIN input instruction display signal off (Steps j, k, l). Then, the CPU 72 checks whether or not the completion signal is present in order to wait for the depressing of the completion key, and if it is present, turns the completion key input instruction display signal off and outputs the operation end display signal to terminate the input operation and waits for the request-to-send signal from the repeater 12 (Steps m, n, p, t).

When the input device 10 is connected to the repeater 12 and the request-to-send signal is sent thereto together with a clock signal, the CPU 72 sequentially outputs the customer information such as the read data, PIN and the like that are stored in the RAM 74 to the output port 82 (Steps t, u, v). When a transmission error occurs and a transmission error signal is sent from the repeater 12, the CPU 72 resends the data (Step w). When the data transmission is terminated and the clear signal is sent from the repeater 12, the read data and PIN stored in the RAM 74 are cleared and the operation of the input device 10 is completed (Steps x, y).

Figure 5:
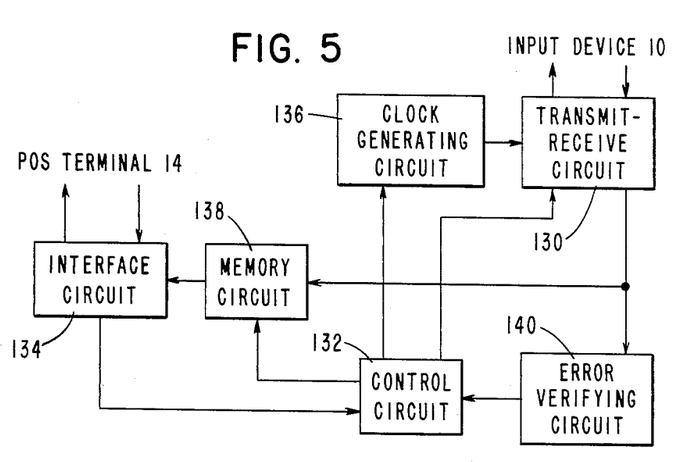
FIG. 5 is a block diagram illustrating a modification of the repeater device.

FIG. 5 is a block diagram illustrating the fundamental structure of the repeater 12 according to a second embodiment of the present invention. The second embodiment of the repeater 12 and the POS terminal 14 will be described with reference to FIGS. 1 and 5. A transmit-receive circuit 130 includes an optical converter circuit (not shown) adapted to receive data from the input device 10 and to transmit the control signal back to the input device. A control circuit 132 is started in operation with the request-to-send signal from the POS terminal 14 and controls individual sections of the repeater 12. When the request-to-send signal is sent to the control circuit 132 through an interface circuit 134, the control circuit sends the request-to-send signal to the input device 10 through the transmit-receive circuit 130 and actuates a clock generating circuit 136 simultaneously therewith to send a transmission clock to the input device 10.

The input device 10 starts to transmit the data, which is in the form of customer information stored in the memory means 28 to the repeater 12, in synchronism with the transmission clock in response to the request-to-send signal. The received data from the input device 10 is stored in a memory circuit 138 of the repeater 12 through the transmit-receive circuit 130 and also is sent to an error verifying circuit 140 for error checking. When a transmission error occurs, an error signal is sent from the error verifying circuit 140 to the control circuit 132. Thus, the control circuit 132 clears the memory circuit 138 and sends a request-to-resend signal to the input device 10 to request the resending of data to the input device 10. When the data transmission is completed, the control circuit 132 sends the clear signal to the transmit-receive circuit 130 so that the input device 10 may erase the customer information stored in the RAM 74. Then, the control circuit 132 controls the sending of the data stored in the memory circuit 138 to the POS terminal 14 through the interface circuit 134. The POS terminal 14 stores the data from the repeater 12 in the memory section 52 (FIG. 1) through the interface circuit 50.

A control section 142 (FIG. 1) checks the data from the repeater 12 for error and if an error is present, requests the repeater to resend the data. When all of the data from the repeater 12 is stored in the memory section 52, the control section 142 sends a clear signal to the repeater. The control circuit 132 (FIG. 5) of the repeater 12 erases the data in the memory circuit 138 in response to the clear signal from the POS terminal 14. Although the aforementioned request-to-send signal is generated from the control section 142 (FIG. 1) upon depression of a request-to-send key on the keyboard 88 of the POS terminal 14 in this embodiment, the request-to-send key and the request-to-send signal generating circuit may be provided on the repeater 12 to output the request-to-send signal from the repeater. The data stored in the memory section 52 is thereafter processed by any conventional technique for the sales transaction. For example, the POS terminal 14 converts the data stored in the memory section 52 into a code, by means of a code converter 146, which is usable in the computer center to send it thereto through a POS controller (not shown) from a transmission section 148 for determining the PIN, inquiring about the balance, and checking for credit about the customer. When the card transaction is admitted by the computer center, the transaction of the customer's account is processed through the depression of keys in the keyboard 88 in the POS terminal 14 and a receipt is printed at a printing section 150. The sum of the purchases is calculated and sent to the computer center through the transmission section 148 and the total price therefor is written into the customer credit file or withdrawn from the customer's account in the bank.

Figure 6A:
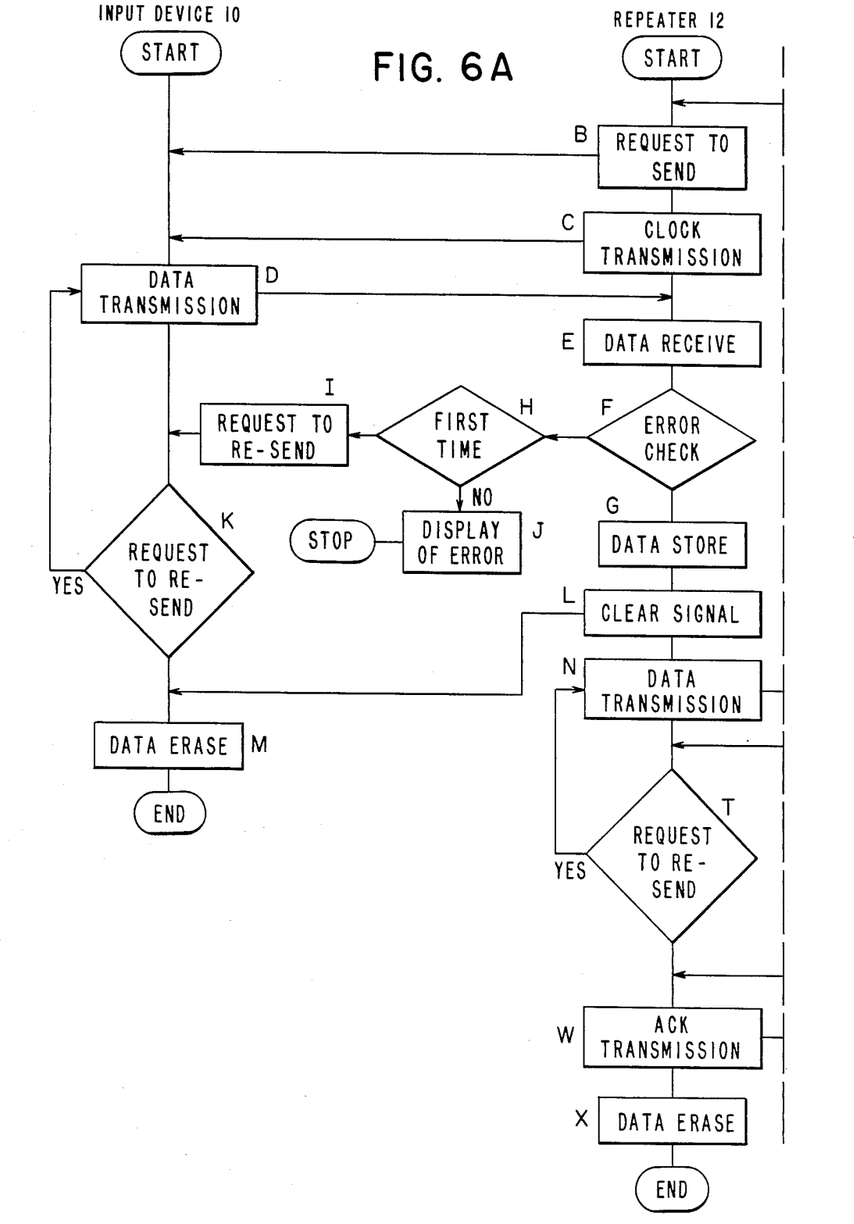
FIGS. 6A and 6B together provide a flowchart showing the flow of data transmission among the input device, the repeater device, and the POS terminal when utilizing the modification of FIG. 5.
Figure 6B:
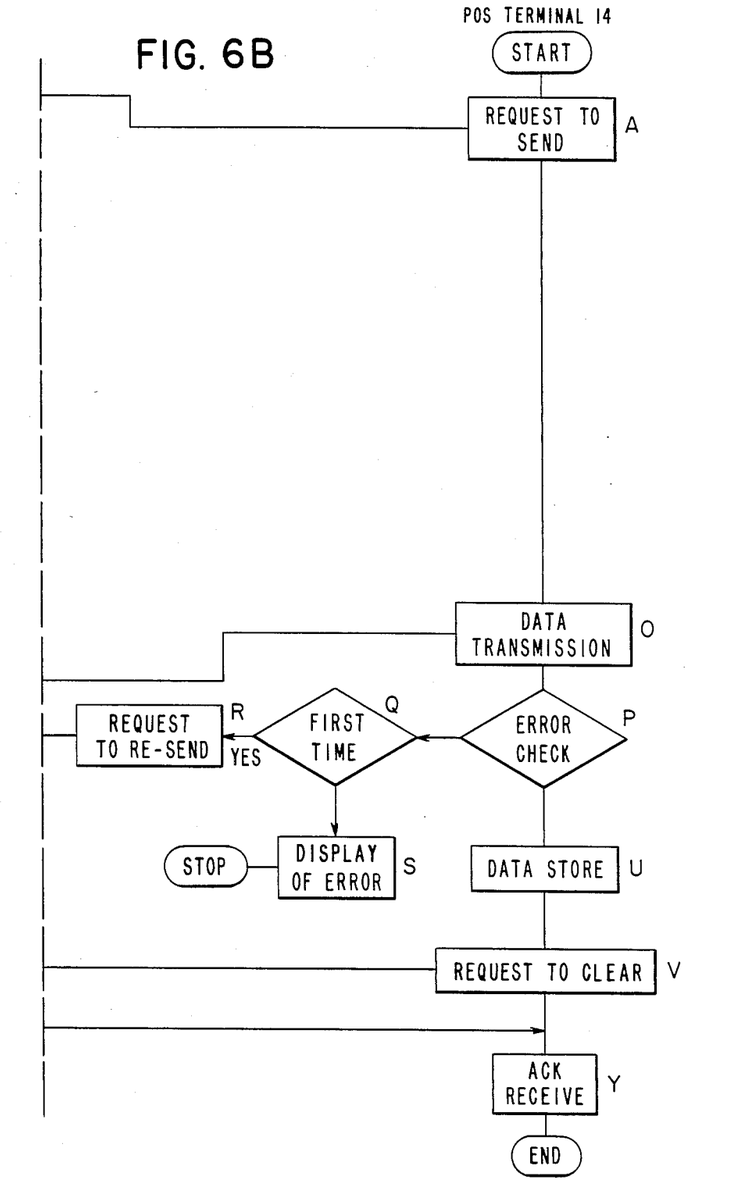

FIGS. 6A and 6B constitute a flowchart showing the data transmission flow among the input device 10, the repeater 12 according to the second embodiment of the present invention, and the POS terminal 14 as illustrated in columnar form under the noted headings. When the request-to-sent signal is sent from the POS terminal 14 to the repeater 12 (Step A), the repeater 12 transmits the request-to-send and transmission clock signals to the input device 10 (Steps B, C). The input device 10 transmits the data (customer information) to the repeater 12 in response to the reception of the request-to-send and transmission clock signals (Step D). The repeater 12 receives the data from the input device 10 and checks the data thus received for error, and stores transmission data in the memory circuit 138 (FIG. 5) when no transmission error is present (Steps E, F, G). On the other hand, when the transmission error occurs, the repeater 12 checks whether or not that transmission error is of the first time and, if so, requests the input device 10 to retry the transmission of the data. When the transmission error occurs during the retry of the transmission, the repeater 12 displays the error and stops the operation (Steps H, I, J). The input device 10 retransmits the data when a request for re-transmission signal is received (Steps K, D). At the completion of data transmission from the input device 10, the repeater 12 sends a clear signal to the input device to clear the data inputted in the RAM 74 (FIG. 3) of the input device (Steps L, M). The data including the PIN in the input device 10 is thus cleared right after it is stored in the repeater 12 in order to alleviate as soon as possible the chance that the PIN stored in the input device 10 is read by a third person.

It is thus seen that when the data is sent from the repeater 12 to the POS terminal 14, the POS terminal checks the data thus received for error (Steps N, O, P). When an error is detected, the error is checked to see if it is a first-time error as in the case of the repeater 12, and the retransmission of data is then requested or the error is displayed (Steps Q, R, S). When the data retransmission is requested, the repeater 12 resends the data (Steps T, N). The POS terminal 14 stores the data transmitted from the repeater 12 and sends a clear signal to the repeater when all the data are stored (Steps U, V). When the clear signal is received the repeater 12 sends an ACK signal to the POS terminal 14 and clears the data stored in the memory circuit 138 (Steps W, X). When the POS terminal 14 receives the ACK signal (Step Y), the data transmission from the repeater 12 to the POS terminal 14 is completed.

In the second embodiment of the present invention, in order to ensure the secrecy of the PIN by clearing the PIN stored in the input device 10 as soon as possible and to increase data transmission reliability, the memory circuit 138 (FIG. 5), the error verification circuit 140, the control circuit 132 and the clock generating circuit 136 are provided in the repeater 12. Alternately, the repeater 12 may include only the transmit-receive circuit 130 (FIG. 5) and the interface circuit 134, and the POS terminal 14 may include the clock generating circuit 136 to directly store the data inputted from the input device 10 in the POS terminal 14 passing through the repeater 12. In this latter case, the clock signal transmission from the clock generating circuit 140, error checking, and the like are controlled by the control section 142 (FIG. 1) in the POS terminal 14.

The customer information input system according to the present invention is of the type wherein the information recorded on a card is inputted into the POS terminal 14, and is of a nature so that any type of credit and/or bank cards can be processed by this system, which system is adapted to identify the kind of read card by interpreting the input data at the control section 142 (FIG. 1) of the POS terminal 14 and to convert a data code into a proper code corresponding to the particular kind of card.

In the present invention, a plurality of input devices 10 are provided for one POS terminal, so that the simultaneous inputting operation by each of a plurality of customers is possible even when such plurality of customers request payment by card at the same time.

Figure 8:
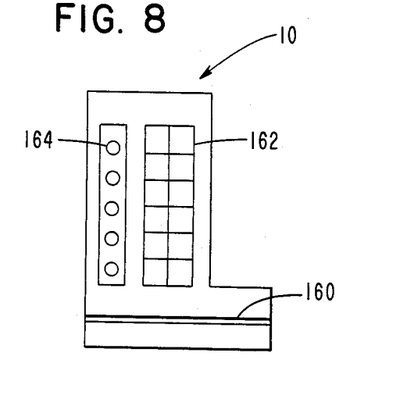
FIG. 8 illustrates an enlarged plan view of the input device of FIG. 7.
Figure 9:
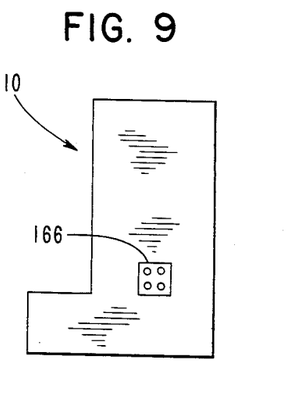
FIG. 9 is an enlarged bottom view of the input device.

FIGS. 8 and 9, respectively, show top and bottom views of the input device 10. In the drawings, 160 is a card reading section, 162 is a keyboard, 164 is a display section comprising a group of photodiodes, and 166 is a light transmit-receive section for sending an optical data signal and receiving an optical control signal from the repeater 12. The data is transmitted by connecting the light transmit-receive receive section 166 of the input device 10 to the light transmit-receive section 168 of the repeater 12 by placing the device 10 over the repeater.

Although FIG. 7 shows the structure wherein the repeater 12 is connected to the POS terminal 14 by cable, the repeater may be provided directly on the POS terminal. While, in the embodiment described, the inputted PIN is inquired of the computer center for credibility, a memory means for previously storing card and PIN's of the cards which are used frequently and a comparing means for comparing the inputted PIN with the stored PIN's may be provided in any of the input devices 10, the repeater 12, the POS terminal 14 or the POS controller. The inputted PIN is verified by comparing with the stored PIN's therein before the on-line inquiry to detect the input of a wrong PIN thereby avoiding useless on-line inquiry. In addition, useless data transfer from the input device 10 to the POS terminal 14 can be avoided by arranging such that PIN's of the cards which are used frequently are stored in advance in the input device 10 and that the retry of inputting the PIN is indicated on the spot when the inputted PIN is different from one of the stored PIN's. Further, it can also be arranged such that the PIN recorded in a card is extracted from the read data by the input device 10, the extracted PIN and the inputted PIN are compared when the PIN is inputted, and the retry of inputting the number is requested when these numbers are different from each other.

The input device 10 of the present invention is of the portable type which includes a customer information inputting section of the POS terminal 14 having a card reading section 160, a PIN input section 162, and a temporary storage for storing the inputted data, so that the input device can be carried to a place where a customer is present for reading the card and inputting the PIN of the customer and wherein the customer need not go to the sales counter. In addition, the customer information inputting operation can be performed by means of the input device 10 independently of the POS terminal operation, so that even when handled by a customer who is not familiar with the inputting operation, other customers can input the data with other input devices thereby preventing the sales counter from being crowded with the customers who are unfamiliar with the input operation. Further, the input device according to the present invention can temporarily store the customer information, so that a plurality of customers can use the respective input devices to simultaneously input their customer information to each of the devices, and then the input devices may connect the POS terminal 14 in sequence for processing the transactions of the respective customers. In addition, the customer information transferred from the input device 10 to the POS terminal 14 through the repeater 12 is instantly completed, so that the time required for the transaction for the purchases for one customer can be reduced by the amount corresponding to the time required for PIN inputting and card reading operations thereby improving the operating efficiency of the POS terminal. Further, since the input device 10 according to the present invention is of the type which reads the data recorded on the card and can transfer and input the data thus read into the POS terminal 14, any data can be inputted to the input device regardless of the kind of card utilized in the transaction. When a different type of POS terminal from the type for the card now being processed is used, such card may be used in the system, and any type of POS terminal can be used for any type of the cards by connecting through the repeater without special handling. Still further, addition of the PIN checking function to the input device 10 can avoid the transfer of an incorrect PIN and useless inquiry of the computer center. Moreover, as has been shown in the embodiments described, the transmission between the input device 10 and the repeater 12 by means of photocouplers can improve the reliability of transmission and facilitate the connection of the input device to the repeater.

It is thus seen that herein shown and described is a customer input system which is operably associated with a POS terminal wherein identifying information and purchase information are provided to the terminal for performing a transaction in rapid and efficient manner. The apparatus of the present invention enables the accomplishment of the objects and advantages mentioned above, and while a preferred embodiment and a modification have been disclosed herein, other variations may occur to those skilled in the art. It is contemplated that all such variations not departing from the spirit and scope of the invention hereof are to be construed in accordance with the following claims.

We claim:

1. An information system for use with a point of sale terminal comprising a portable input device having means for reading information recorded on a credit card, means for entering indicia idnetifying the holder of the credit card, memory means for storing such information and indicia, such information and indicia being transmitted from the memory means to the POS terminal in response to a request to send signal from the POS terminal, and means connected to the POS terminal and operably associated with the input device dependent upon demand of sales transactions during a specified period of time for sequentially transmitting the information and the indicia from the transmitting means of the input device to the POS terminal in response to hte request to send signal.

2. The system of claim 1 wherein the input device includes a slot for receiving the credit card and for reading magnetic information recorded on the credit card.

3. The system of claim 1 wherein the input device includes a central processing unit for controlling flow of information from the input device to the POS terminal.

4. The system of claim 1 wherein the means for entering indicia is a keyboard operable by the holder of the credit card.

5. The system of claim 1 wherein the memory means includes random access memory devices and read only memory devices.

6. The system of claim 1 wherein the means for transmitting the information and indicia is a repeater device operable when the input device is placed in position for operating with the repeater device.

7. The system of claim 1 wherein the input device includes display means responsive to operation of the indicia entering means and display control means for verifying operable by the holder of the credit card of data entered thereby.

8. The system of claim 6 wherein the repeater device includes a plurality of photocouplers for transmitting signals between the input device and the repeater device.

9. The system of claim 1 wherein the means for transmitting the information and indicia is a repeater device including a transmit-receive circuit connected to the input device, an error verifying circuit connected to the transmit-receive circuit, a control circuit connected to the error verifying circuit and to the transmit-receive circuit, a memory circuit connected to the control circuit and to the transmit receive circuit, and an interface circuit connected to the input device through the memory circuit and through the transmit-receive circuit and to the terminal.

10. A method of performing a point of sale transaction with a credit card comprising the steps of:

reading information recorded on the credit card, entering indicia into a portable input device identifying a holder of the credit card, storing the information and the indentifying indicia in the input device until requested in sequential mode dependent upon demand of sales transactions during a specified period of time, and transmitting the information and the indicia from the portable input device to a point of sale terminal through an intermediate device in response to demand of sales transactions and access to the POS terminal and to a request to send signal therefrom.

11. The method of claim 10 including the step of displaying the information recorded on the card for by the holder thereof.

12. The method of claim 10 including the step of placing the input device on the intermediate device for transmitting signals from the input device to the POS terminal.

* * * * *

UNITED STATES PATENT AND TRADEMARK OFFICE
CERTIFICATE OF CORRECTION

PATENT NO. : 4,722,054
DATED : January 26, 1988
INVENTOR(S) : Shin-ichi Yorozu et al.

It is certified that error appears in the above—identified patent and that said Letters Patent is hereby corrected as shown below:

Column 11, line 9, "idnetifying" should be --identifying--.

Column 11, line 21, "hte" should be --the--.

Column 12, line 24, "indentifying" should be --identifying--.

Column 12, line 34, after the word "for" the word --verification-- should be inserted.

Signed and Sealed this

Nineteenth Day of July, 1988

Attest:

DONALD J. QUIGG

*Attesting Officer*  *Commissioner of Patents and Trademarks*